W. A. BIRCHETT.
REVERSING GEAR FOR ENGINES.
APPLICATION FILED MAY 25, 1912.
1,080,884.
Patented Dec. 9, 1913.
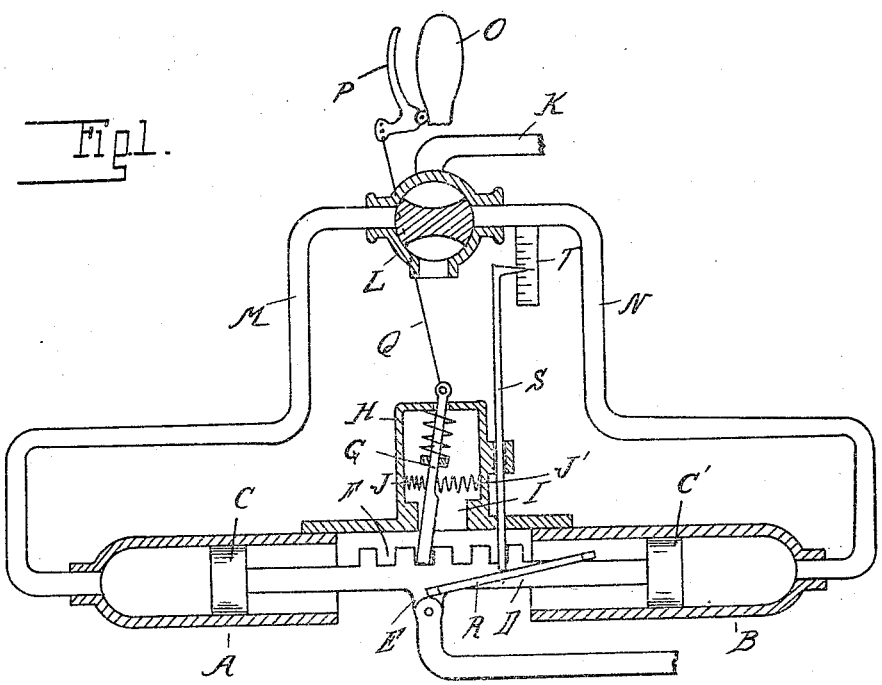
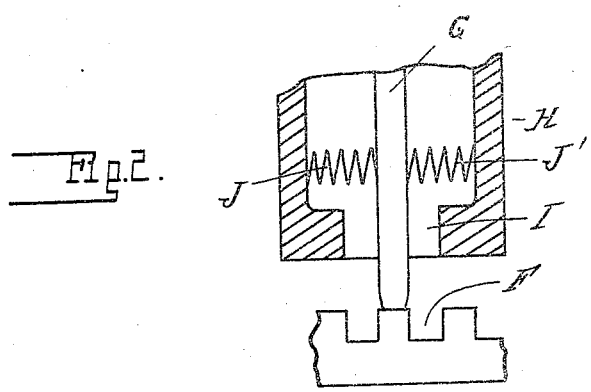
Witnesses
W. B. Ford
James P. Barry
Inventor
Winzor A. Birchett,
By Whittemore Hulbert & Whittemore
Atty's

UNITED STATES PATENT OFFICE.

WINZOR A. BIRCHETT, OF DETROIT, MICHIGAN.

REVERSING-GEAR FOR ENGINES.

1,080,884.		Specification of Letters Patent.		Patented Dec. 9, 1913.

Application filed May 25, 1912. Serial No. 699,617.

*To all whom it may concern:*

Be it known that I, WINZOR A. BIRCHETT, a citizen of the United States of America, residing at Detroit, in the county of Wayne and State of Michigan, have invented certain new and useful Improvements in Reversing-Gear for Engines, of which the following is a specification, reference being had therein to the accompanying drawings.

The invention relates to reverse gears designed for use in connection with steam engines, and it is the object of the invention to obtain a simple construction of control mechanism combined with means for indicating each position of adjustment as hereinafter set forth.

In the drawings: Figure 1 is a diagrammatic section elevation illustrating the mechanism. Fig. 2 is a detail view showing the operation of the latch mechanism.

A and B are two opposed axially alined cylinders. C and C' are pistons in said cylinders which are connected to a common rod D having a laterally extending arm E connected by means (not shown) to the reverse lever. The rod D is also provided with a series of notches F which are adapted to coöperate with a latch member G to hold the rod in different positions of adjustment. This latch member G consists of a spring pressed bolt longitudinally movable in a bracket member H secured in fixed position. The bolt is also provided with a limited lateral adjustment in a slotted bearing I, but is normally held in central position by opposed springs J and J'.

K is a conduit for the steam or other compressed fluid leading to a valve L, which controls the admission and exhausting of said compressed fluid from conduits M and N leading respectively to the cylinders A and B. As shown in Fig. 1 this valve in its neutral position will disconnect both of the conduits M and N from the supply conduit K, and when adjusted on one side of said position will supply the compressed fluid to one of said conduits, while a movement in the opposite direction will supply the compressed fluid to the opposite conduit.

O is a handle for operating the valve and P is an adjacent controlling handle that may be grasped simultaneously with the handle O, and which is connected by a rod Q with the latch bolt G.

R is a cam secured to the rod D which is in engagement with an indicator rod S leading to a point for observation adjacent to the controlling valve and operating in conjunction with an indicator scale T.

With the construction as described in the normal position of parts the latch bolt G will be in engagement with one of the notches F in the rod D and will also be at one limit of its lateral adjustment in the slotted bearing I on the bracket H. Thus the rod D will be held from displacement even where one of the pistons is under active pressure of the steam or other compressed fluid. To adjust the mechanism the handle O and the valve L is first moved to its neutral position where steam will be cut off from both of the conduits M and N. The handle P may then be operated by a movement of the operator's fingers so as to withdraw the latch bolt G from the notch F with which it is in engagement. As soon as said bolt is free the pressure of the opposed springs J and J' will cause it to assume a central position in the slotted bearing I, where it will be out of registration with the notch formerly engaged thereby, and will bear against a portion of the rod D intermediate notches. The handle O may then be adjusted in either direction and by so doing steam is admitted to one of the conduits M or N. This will cause a movement of the piston and corresponding movement of the rod D, which will continue until another notch F is registered with the latch bolt G, which will be forced by its spring into engagement with said notch. This will prevent further adjustment of the rod D until the latch bolt is again withdrawn, and consequently the rod may be actuated with a step-by-step movement until the desired point of adjustment is attained. During the movement of the rod D the cam R will be correspondingly shifted in position which by reason of its engagement with the indicator rod S will shift the latter thereby, indicating the exact position of adjustment on the scale T.

What I claim as my invention is:

1. The combination of axially alined opposed cylinders, pistons in said cylinders, a rod connecting said pistons, a latch bolt having a plurality of points of engagement with said rod and a limited lateral adjustment, a valve controlling the alternative admission of compressed fluid to said cylinders, an operating lever for said valve, means associating with said operating lever for withdrawing said latch bolt to disengage same from said rod, and means for laterally shifting said latch bolt when withdrawn to prevent reëngagement of the same at the same point.

2. The combination with a cylinder and a piston therein of a rod for actuating the reverse mechanism connected to said piston and provided with a series of notches, a latch bolt for engaging said notches and provided with a limited lateral adjustment, means for centering said latch bolt between the limits of its adjustment when withdrawn from said notches, and associated means for admitting compressed fluid to said cylinders to actuate said piston and adjust said rod.

3. The combination with a cylinder and a piston therein of a rod for actuating the reverse gear connected to said piston and provided with a series of notches, a latch bolt for engaging said notches and limiting the movement of said rod, said bolt being provided with a limited lateral movement, means operating upon the withdrawal of said bolt for centering the same between its limits of lateral movement, and thereby shifting the same out of registration with the notch previously engaged, and associated means for admitting compressed fluid in said cylinder to adjust the piston and rod until another notch is in registration with said latch bolt and engaged thereby.

4. The combination with a cylinder and piston therein of a rod connected to said piston for operating the reverse gear and provided with a series of notches, a spring pressed latch bolt for engaging said notches, a bearing in which said latch bolt is secured providing a limited lateral adjustment of the same, opposed springs for centering said bolt when withdrawn from said notches, means for withdrawing said bolt from said notches, and associated means for admitting compressed fluid to said cylinder.

5. The combination of opposed axially alined cylinders, pistons in said cylinders, a rod connecting said pistons and provided with a series of notches, a spring pressed latch bolt for engaging said notches, a supporting member for said latch bolt, providing a limited lateral adjustment thereof, opposed springs for normally centering said bolt between its limits of adjustment, means for withdrawing said bolt and associated means for admitting compressed fluid alternatively to said cylinders.

6. The combination with a cylinder and a piston therein of a rod connected to said piston for actuating the reverse gear and provided with a series of notches, a latch bolt for engaging said notches, a cam connected to and movable with said rod, an indicator actuated by said cam to indicate the position of adjustment of said rod, means for withdrawing said latch bolt, and associated means for admitting compressed fluid to said cylinder.

In testimony whereof I affix my signature in presence of two witnesses.

WINZOR A. BIRCHETT.

Witnesses:
JAMES P. BARRY,
ADELAIDE F. ADAMS.

---

Copies of this patent may be obtained for five cents each, by addressing the "Commissioner of Patents, Washington, D. C."